Sept. 8, 1959
J. GALLO, SR
2,902,815
RAKE AND GRAPPLE
Filed March 14, 1958
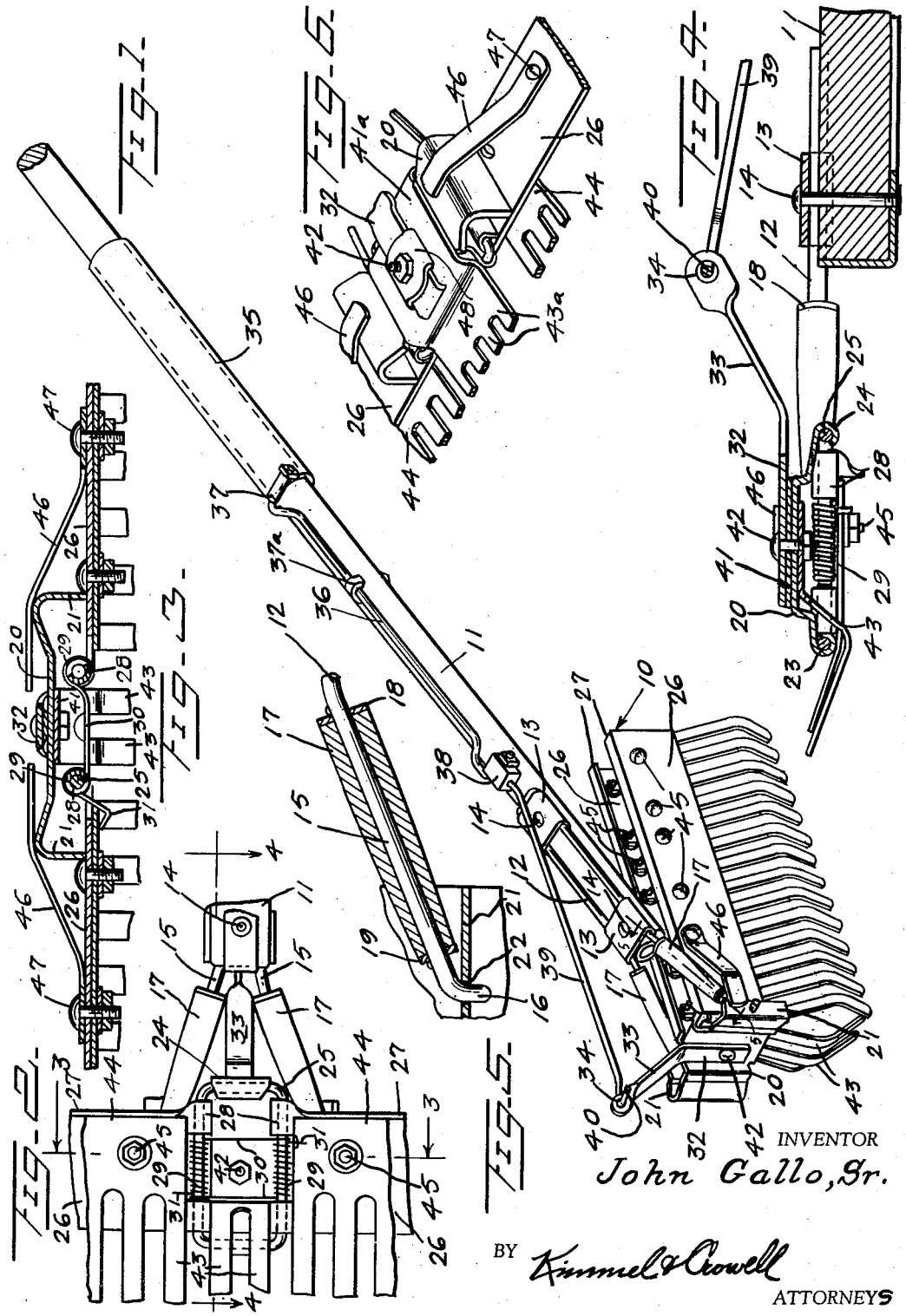
INVENTOR
John Gallo, Sr.
BY Kimmel & Crowell
ATTORNEYS

2,902,815
RAKE AND GRAPPLE
John Gallo, Sr., Boston, Mass.

Application March 14, 1958, Serial No. 721,449

4 Claims. (Cl. 56—400.19)

The present invention relates to rakes, and particularly to rakes of the type adapted to grasp the raked material for moving it to a storage position.

The primary object of the invention is to provide a rake adapted to positively grasp the raked material for moving the material to a storage location.

Another object of the invention is to provide a rake structure having the tines thereof mounted for swinging movement and having means for maintaining the tines in a normally aligned relation.

A further object of the invention is to provide a rake having swinging tines and cam means for swinging the tines to a grasping position adjacent each other.

A still further object of the invention is to provide a rake of the class described above which is inexpensive to manufacture, simple to use, and which is durable in hard service.

Other objects and advantages will become apparent in the following specification when considered in the light of the attached drawings in which:

Figure 1 is a perspective view of the invention shown in grasping position, partially broken away for convenience of illustration.

Figure 2 is an enlarged fragmentary bottom plan view of the rake shown in open position.

Figure 3 is an enlarged fragmentary transverse cross-section taken along the line 3—3 of Figure 2, looking in the direction of the arrows.

Figure 4 is an enlarged fragmentary longitudinal cross-section taken along the line 4—4 of Figure 2, looking in the direction of the arrows.

Figure 5 is an enlarged fragmentary longitudinal section taken along the line 5—5 of Figure 1, looking in the direction of the arrows.

Figure 6 is a fragmentary perspective view of a modified form of the invention.

Referring now to the drawings in detail wherein like reference characters indicate like parts throughout the several figures, the reference numeral 10 indicates generally a rake constructed in accordance with the invention.

The rake 10 includes an elongated cylindrical handle 11 having a longitudinally extending U-shaped mount 12 secured to the lower end thereof by means of a pair of spaced apart brackets 13 fastened to the handle 11 by bolts 14. The U-shaped mount 12 is provided with a pair of integral diverging shafts 15 each terminating in an outwardly offset end portion 16.

A cam roller 17 is journalled on each of the shafts 15 between a pair of oppositely disposed washers 18, 19 fixed on the shaft 15. The cam roller 17 tapers from the end closest to the handle 11 having its smallest diameter closest to the outwardly offset end portion 16.

A generally rectangular frame member 20 is provided with oppositely disposed depending side flanges 21. The side flanges 21 are provided with aligned bores 22 which engage over the outwardly offset end portions 16 of the shafts 15 journalling the frame 20 thereon. The frame 20 is provided with an integral loop 23 on its forward edge and a second integral loop 24 on its rear edge arranged parallel to the loop 23.

A mounting member 25 is arranged in a generally rectangular form and has a generally cylindrical cross-section. The mounting member 25 has the front and rear portions thereof enclosed in the loops 23, 24, respectively, with the side portions thereof extending inwardly of and parallel to the flanges 21.

A pair of oppositely disposed plates 26 are each provided with a depending flange 27 along the rear edge thereof. The plates 26 are each provided with an integral loop 28 arranged in encompassing relation to the side portions of the mounting member 25.

The loop 28 is cut away centrally to receive a coil spring 29 wound on the side portions of the mounting member 25. The coil springs 29 each have an end 30 thereof engaging the side portion of the mounting member 25 adjacent the opposite coil spring 29, and a second end portion 31 which engages under the plate 26 to normally swing the plate 26 into horizontal aligned position, as illustrated in Figure 3.

An arm 32 is arranged in engagement with the upper face of the frame 20 and has an offset rearwardly and upwardly extending end portion 33 integrally formed thereon. The rear terminal end of the arm 32 is provided with a bore 34, for reasons to be assigned.

A tubular slide hand grip 35 is telescopically mounted on the handle 11 and has a link 36 pivotally secured at 37 to one end of the hand grip 35. A guide 37a is mounted in the handle 11 and arranged in guiding relation to the link 36.

A block 38 is pivotally secured to the end of the link 36 opposite the hand grip 35 and has an elongated connecting rod 39 threadably secured thereto at one end and having an offset end portion 40 journalled in the bore 34 at the opposite end so that movement of the hand grip 35 along the handle 11 will swing the arm 32 and frame 20 about the outwardly offset end portion 16 of the shafts 15.

A tine plate 41 is arranged in underlying relation on the frame 20 oppositely of the arm 32 and a bolt 42 extends through the arm 32, frame 20, and tine plate 41 securing them together. A plurality of tines 43 extend downwardly and forwardly from the tine plate 41 and are then arched upwardly and outwardly into raking position.

A plurality of tine carrying units 44 are secured in underlying relation to the plates 26 by means of bolts 45. The tines 43 are aligned with the tine carrying units 44 to provide a grass and leaf rake structure when the plates 26 are in aligned position.

A spring arm 46 is secured at its outer end to the plates 26 by means of bolts 47 and the inner end of the spring arms 46 engage over the outer edge portion of the frame 20 to assist the coil springs 29 in maintaining the plates 26 in aligned relation during a raking operation.

In the use and operation of the invention, with the plates 26 in aligned position, the rake 10 is used in the conventional manner to rake relatively light materials such as grass and leaves, and when a quantity of raked material has been collected together the hand grip 35 is moved along the handle 11 toward the rake 10 so that the rear inner edges of the plates 26 engage the rollers 17 whereupon further movement of the hand grip 35 causes the plates 26 to be cammed together by the cam rollers 17 into the position illustrated in Figure 1.

In the position illustrated in Figure 1, the rake 10 grasps the material raked together which is then moved to a storage or disposal position whereupon the hand grip 35 is released and the springs 29 and 46 return the plates 26 to their aligned position preparatory to another raking operation.

Referring now to Figure 6, a modification of the invention is illustrated wherein the tine plate 41a is positioned in engagement with the upper surface of the frame 20 with the arm 32 positioned thereagainst. A bracket 48 overlies the arm 32 and the bolt 42 extends through the frame 20, the tine plate 41a, arm 32, and bracket 48 securing the elements together in a single unit. The tines 43a on the tine plate 41a are shaped to align with the tines on the tine carrying units 44 to provide a continuous grass rake structure when in extended position.

Having thus described the preferred embodiments of the invention, it should be understood that numerous structural modifications and adaptations may be resorted to without departing from the scope of the appended claims.

What is claimed is:

1. A rake comprising a handle, a mount secured in longitudinally extending relation to said handle, a pair of outwardly diverging shafts integrally formed on said mount, an outwardly offset end portion integrally formed on the outer end of each of said shafts, said end portions being arranged in axially aligned relation, a cam roller journalled on each of said shafts, a frame having the opposite sides thereof journalled on said outwardly offset end portions, means on said handle connected to said frame for swinging said frame on said offset end portions, a pair of oppositely disposed plates hingedly secured to opposite sides of said frame, a plurality of tines supported on said plates, said plates moving with said frame on pivotal movement of said frame engaging respectively said cam rollers to thereby pivot said plates with respect to said frame and each other into closely adjacent parallel relation, and means resiliently biasing said plates into aligned relation.

2. A device as claimed in claim 1 wherein a central tine plat is fixedly secured to said frame and is provided with a plurality of forwardly extending tines.

3. A device as claimed in claim 1 wherein said resilient means biasing said plates into aligned relation includes a spring bar fixedly secured to each of said plates and engaging over opposite sides of said frame.

4. A device as claimed in claim 3 wherein said cam rollers taper from one end thereof to the other having the largest diameter portions thereof adjacent said handle and the smaller diameter portions thereof adjacent said frame.

References Cited in the file of this patent

UNITED STATES PATENTS

| | | |
|---|---|---|
| 2,790,296 | Bernstein | Apr. 30, 1957 |
| 2,840,978 | Spinosa | July 1, 1958 |

FOREIGN PATENTS

| | | |
|---|---|---|
| 58,935 | Denmark | July 28, 1941 |
| 118,308 | Australia | Mar. 22, 1944 |